United States Patent [19]

Amatatsu et al.

[11] Patent Number: 5,760,196
[45] Date of Patent: Jun. 2, 1998

[54] MONOAZO BLUE DISPERSE DYE COMPOUNDS AND METHODS FOR DYEING OR PRINTING HYDROPHOBIC FIBER MATERIALS USING THE SAME

[75] Inventors: Yoshimasa Amatatsu, Habikino; Kazufumi Yokogawa, Toyonaka; Yousuke Yamamoto, Nishinomiya; Nobuyuki Katsuda, Ashiya, all of Japan

[73] Assignee: Sumitomo Chemical Company, Limited, Osaka, Japan

[21] Appl. No.: 603,322

[22] Filed: Feb. 20, 1996

[30] Foreign Application Priority Data

| Feb. 20, 1995 | [JP] | Japan | 7-030901 |
| Nov. 6, 1995 | [JP] | Japan | 7-287063 |
| Dec. 26, 1995 | [JP] | Japan | 7-338635 |

[51] Int. Cl.$^6$ ............ C09B 29/033; C09B 29/09; D06P 3/52
[52] U.S. Cl. ............ 534/753
[58] Field of Search ............ 534/753

[56] References Cited

U.S. PATENT DOCUMENTS

| 3,816,388 | 6/1974 | Weaver et al. | 534/753 X |
| 4,079,050 | 3/1978 | Baird et al. | 534/753 X |
| 4,092,329 | 5/1978 | Jotterand | 534/753 X |
| 4,108,867 | 8/1978 | Baird et al. | 534/753 X |
| 4,211,696 | 7/1980 | Baird et al. | 534/753 |
| 4,264,495 | 4/1981 | Maher et al. | 534/753 |
| 4,507,407 | 3/1985 | Kluger et al. | 521/113 |
| 4,751,288 | 6/1988 | Bergmann et al. | 534/791 |
| 4,952,681 | 8/1990 | Hansen et al. | 534/766 |
| 5,283,326 | 2/1994 | Hansen et al. | 534/766 |
| 5,352,774 | 10/1994 | Hansen et al. | 534/766 |
| 5,527,888 | 6/1996 | Himeno et al. | 534/794 |

FOREIGN PATENT DOCUMENTS

| A201896 | 11/1986 | European Pat. Off. |
| A2190883 | 2/1974 | France . |
| A2304203 | 8/1973 | Germany . |
| 2938633 | 4/1981 | Germany | 534/753 |
| 58-038754 | 3/1983 | Japan . |
| 58-157863 | 9/1983 | Japan . |
| 59-093751 | 5/1984 | Japan . |
| 59-093752 | 5/1984 | Japan . |
| 59-096164 | 6/1984 | Japan . |
| 59-096165 | 6/1984 | Japan . |
| 59-096166 | 6/1984 | Japan . |
| 59-096167 | 6/1984 | Japan . |
| 60-239291 | 11/1985 | Japan . |
| 61-123666 | 6/1986 | Japan . |
| 05105817 | 4/1993 | Japan . |
| 1351381 | 4/1974 | United Kingdom . |
| 1351382 | 4/1974 | United Kingdom . |
| 1304367 | 5/1975 | United Kingdom | 534/753 |
| 1394365 | 5/1975 | United Kingdom . |
| 1394366 | 5/1975 | United Kingdom . |
| 1394367 | 5/1975 | United Kingdom . |
| 1394368 | 5/1975 | United Kingdom . |
| 1521122 | 8/1978 | United Kingdom . |

*Primary Examiner*—Floyd D. Higel
*Attorney, Agent, or Firm*—Watson Cole Stevens Davis, P.L.L.C.

[57] ABSTRACT

A monoazo compound of the following formula(I):

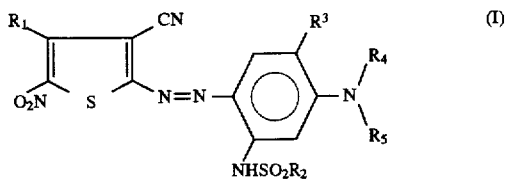

wherein $R_1$ represents a hydrogen atom or a chlorine atom; $R_2$ represents a phenyl group or an alkyl group which is unsubstituted or substituted; $R_3$ is a hydrogen atom or $C_1$–$C_4$ alkoxy; and $R_4$ and $R_5$ represent a hydrogen atom, an allyl group, a tetrahydrofurfuryl group, or an alkyl group which is unsubstituted or substituted by a chlorine atom, a cyano group, an alkoxy group, a hydroxy group, a phenoxyalkoxy group, a phenoxy group, a phenyl group, a benzyloxy group, an alkoxycarbonyl group, an alkoxycarbonyloxy group, an alkanoyloxy group, a benzoyloxy group, a phenoxycarbonyloxy group, an alkanoyl group, an alkoxyalkoxycarbonyl group, tetrahydrofurfuryloxy carbonyl group or an alkoxyalkoxy group; provided that $R_4$ and $R_5$ are not hydrogen atoms or a substituted alkyl group simultaneously; and a method for dyeing or printing a hydrophobic fiber material using the monoazo compound.

8 Claims, No Drawings

MONOAZO BLUE DISPERSE DYE COMPOUNDS AND METHODS FOR DYEING OR PRINTING HYDROPHOBIC FIBER MATERIALS USING THE SAME

The present invention relates to a monoazo compound useful for dyeing or printing hydrophobic fiber materials and capable of giving a bright blue dyed product excellent in various properties such as washing fastness.

So far, various kinds of monoazo type blue disperse dyes for hydrophobic fiber materials such as polyester have been proposed. For example, a monoazo type blue disperse dye represented by the following formula:

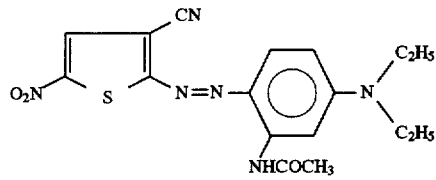

is described in JP-A-48-84120. However, the monoazo type blue disperse dye is not sufficient in brightness of color.

In recent years, in order to cope with a consumers' trend toward higher grade clothing, dyed or printed products mainly comprising hydrophobic fiber materials dyed or printed with disperse dye have come to be subjected to various after-finishing treatments such as softening, antistatic and feel-improving finishing to give higher added values. These after-finishing treatments are, however, carried out at high temperatures which often cause dye bleed so that the dyed or printed products deteriorate in their wet fastness, particularly washing fastness.

Under such circumstances, developments of bright blue disperse dyes excellent in dyeability as well as in various fastness such as light fastness, sublimation fastness and wet fastness have been desired.

Inventors of the present invention have conducted extensive studies to develop such dyes and, as a result, have found that certain specific monoazo compounds are very suitable for the above-mentioned objects. The present invention has thus been accomplished.

The present invention provides a monoazo compound represented by the following formula(I):

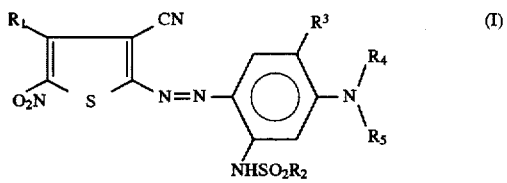

wherein $R_1$ represents a hydrogen atom or a chlorine atom; $R_2$ represents a phenyl group or a straight chain or branched chain alkyl group which is unsubstituted or substituted; $R_3$ is a hydrogen atom or $C_1$–$C_4$ alkoxy; and $R_4$ and $R_5$, which are same or different, represent a hydrogen atom, an allyl group, a tetrahydrofurfuryl group, or a straight chain or branched chain $C_1$–$C_6$ alkyl group which is unsubstituted or substituted by one or two substituents selected from a chlorine atom, a bromine atom, a cyano group, an alkoxy group, a hydroxy group, a phenoxyalkoxy group, a phenoxy group, a phenyl group, a benzyloxy group, an alkoxycarbonyl group, an alkoxycarbonyloxy group, an alkanoyloxy group, a benzoyloxy group, a phenoxycarbonyloxy group, an alkanoyl group, an alkoxyalkoxycarbonyl, tetrahydrofurfuryloxy carbonyl group and an alkoxyalkoxy group; provided that $R_4$ and $R_5$ are not simultaneously hydrogen atoms, and that $R_4$ and $R_5$ are not simultaneously straight chain or branched chain $C_1$–$C_6$ alkyl groups which are substituted by one or two substituents selected from a phenoxyalkoxy group, a phenoxy group, a phenyl group, a benzyloxy group, a benzoyloxy group and a phenoxycarbonyloxy group.

The present invention also provides a method for dyeing or printing hydrophobic fiber materials using the monoazo compound.

$R_1$ in the formula(I) is preferably a hydrogen atom. $R_2$ in the formula (I) is preferably a phenyl group or a straight chain or branched chain $C_1$–$C_5$ alkyl group unsubstituted or substituted by a chlorine atom, a cyano group, a $C_1$–$C_3$ alkoxy group or the like, and more preferably a phenyl group or an unsubstituted $C_1$–$C_4$ alkyl group such as a methyl group or an ethyl group. $R_3$ in the formula(I) is preferably a hydrogen atom or a $C_1$–$C_3$ alkoxy group such as a methoxy group or an ethoxy group, and more preferably a hydrogen atom.

The straight chain or branched chain alkyl groups denoted by $R_4$ or $R_5$ in the formula(I) may be unsubstituted alkyl groups, alkyl groups substituted by one substituent or alkyl groups substituted by two substituents.

Examples of the unsubstituted alkyl groups denoted by $R_4$ or $R_5$ include
a methyl group, an ethyl group, an n-propyl group, an i-propyl group, an n-butyl group, an n-pentyl group and an n-hexyl group.

Examples of the alkyl groups denoted by $R_4$ or $R_5$ and substituted by one substituent include
a chlorosubstituted alkyl group such as 3-chloropropyl group and 2-chloroethyl group; a bromosubstituted alkyl group such as 3-bromopropyl group and 2-bromoethyl group; a cyanosubstituted alkyl group such as 2-cyanoethyl group; a ($C_1$–$C_4$ alkoxy)substituted alkyl group such as 2-methoxyethyl group, 2-ethoxyethyl group, 3-methoxypropyl group and 3-ethoxypropyl group; a hydroxysubstituted alkyl group such as 2-hydroxyethyl group, 2-hydroxypropyl group, 3-hydroxypropyl group and 4-hydroxybutyl group; a phenoxyalkoxy substituted alkyl group such as 2-(2-phenoxyethoxy)ethyl group; a phenoxysubstituted alkyl group such as 2-phenoxyethyl group; a benzyloxy substituted alkyl group such as 2-benzyloxyethyl group; a phenylsubstituted alkyl group such as phenethyl group and benzyl group; a $C_2$–$C_5$ alkanoyloxy ethyl group such as 2-acetoxyethyl group, 4-acetoxybutyl group and 2-propionyloxy ethyl group; a benzoyloxy substituted alkyl group such as 2-benzoyloxyethyl group; a $C_2$–$C_5$ alkoxycarbonyl(in this specification, "$C_2$–$C_5$ alkoxycarbonyl" means "carbonyl substituted by C1–C4 alkoxy) substituted alkyl group such as 2-methoxycarbonyl ethyl group and 2-ethoxycarbonyl ethyl group; a $C_2$–$C_5$ alkoxycarbonyloxy substituted alkyl group such as 2-methoxycarbonyloxy ethyl group and 2-ethoxycarbonyloxy ethyl group; a phenoxycarbonyloxy substituted alkyl group such as 2-phenoxycarbonyloxy ethyl group; a $C_2$–$C_5$ alkanoylsubstituted alkyl, group such as 2-acetylethyl group and 2-propionylethyl group; an alkoxyalkoxycarbonyl substituted alkyl group in which each of the alkoxy groups has one to four carbon atoms such as 2-(2-methoxyethylcarbonyl)ethoxy group; an alkoxyalkoxy substituted alkyl group in which each of the alkoxy groups has one to four carbon atoms such as 2-(2-methoxyethoxy)ethyl group, 2-(2-ethoxyethoxy) ethyl group and 2-(2-butoxyethoxy)ethyl group; and a tetrahydrofurfuryloxy carbonyl substituted alkyl group such as tetrahydrofurfuryloxy carbonyl ethyl group.

Among the above-mentioned alkyl groups substituted by one substituent, a cyanosubstituted alkyl group such as 2-cyanoethyl group; a $C_1$–$C_4$ alkoxysubstituted alkyl group such as 2-methoxyethyl group, 2-ethoxyethyl group, 3-methoxypropyl group and 3-ethoxypropyl group; a hydroxysubstituted alkyl group such as 2-hydroxyethyl group, 2-hydroxypropyl group, 3-hydroxypropyl group and 4-hydroxybutyl group; a phenoxyalkoxy substituted alkyl group such as 2-(2-phenoxyethoxy)ethyl group; a phenoxysubstituted alkyl group such as 2-phenoxyethyl group; a phenylsubstituted alkyl group such as phenethyl group and benzyl group; a $C_2$–$C_5$ alkanoyloxy ethyl group such as 2-acetoxyethyl group, 4-acetoxybutyl group and 2-propionyloxy ethyl group; a benzoyloxy substituted alkyl group such as 2-benzoyloxyethyl group;:a $C_2$–$C_5$ alkoxycarbonyl substituted alkyl group such as 2-methoxycarbonyl ethyl group and 2-ethoxycarbonyl ethyl group; a $C_2$–$C_5$ alkoxycarbonyloxy substituted alkyl group such as 2-methoxycarbonyloxy ethyl group and 2-ethoxycarbonyloxy ethyl group; a phenoxycarbonyloxy substituted alkyl group such as 2-phenoxycarbonyloxy ethyl group; an alkoxyalkoxy substituted alkyl group in which each of the alkoxy groups has one to four carbon atoms such as 2-(2-methoxyethoxy) ethyl group, 2-(2-ethoxyethoxy) ethyl group and 2-(2-butoxyethoxy)ethyl group; and a tetrahydrofurfuryloxy carbonyl substituted alkyl group are preferred. Among the preferred examples, particularly preferred examples include the above-mentioned cyanosubstituted alkyl, $C_1$–$C_4$ alkoxysubstituted alkyl, hydroxysubstituted alkyl, phenoxysubstituted alkyl, $C_2$–$C_5$ alkanoyloxy substituted alkyl, $C_2$–$C_5$ alkoxycarbonyl substituted alkyl, _$C_2$–$C_5$ alkoxycarbonyloxy substituted alkyl, alkoxyalkoxy substituted alkyl in which each of the alkoxy groups has one to four carbon atoms and tetrahydrofurfuryloxy carbonyl substituted alkyl groups.

Examples of the alkyl groups denoted by $R_4$ or $R_5$ and substituted by two substituents include 3-phenoxy-2-hydroxypropyl group, 3-methoxy-2-hydroxypropyl group, 3-butoxy-2-hydroxypropyl group, 3-methoxy-2-acetoxypropyl group and 3-ethoxy-2-acetoxypropyl group.

Among compounds of the present invention, compounds of formula (I) wherein one of $R_4$ and $R_5$ is a cyanosubstituted alkyl, $C_1$–$C_4$ alkoxysubstituted alkyl,hydroxysubstituted alkyl, phenoxysubstituted alkyl, $C_2$–$C_5$ alkanoyloxy substituted alkyl, $C_2$–$C_5$ alkoxycarbonyl substituted alkyl, $C_2$–$C_5$ alkoxycarbonyloxy substituted alkyl, alkoxyalkoxy substituted alkyl in which each of the alkoxy groups has one to four carbon atoms or tetrahydrofurfuryloxy carbonyl substituted alkyl group, and another is an unsubstituted alkyl group;

$R_1$ is a hydrogen atom;
$R_3$ is a hydrogen atom, a methoxy group or an ethoxy group; and $R_2$ is a methyl group or an ethyl group are preferred.

The monoazo compound of formula (I) can be produced, for example, by a diazotization of a 2-amino-3-cyano-5-nitrothiophene represented by the following formula (II):

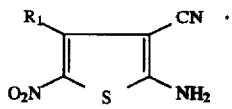

wherein $R_1$ is as defined above according to a conventional method, followed by a coupling reaction of the diazonium compound thus obtained with a 3-N-substitutedaminoalkylsulfonyl aminobenzene compound or a 3-N-substitutedamino-phenylsulfonylamino benzene compound represented by the following formula (III):

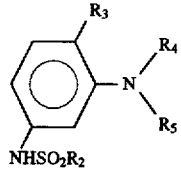

wherein $R_2$, $R_3$, $R_4$ and $R_5$ are as defined above. The compound of formula(II), 2-amino-3-cyano-5-nitrothiophene, is a known compound which can be produced by a method described, for example, in JP-A-48-84120, JP-B-55-18710 or JP-A-6-25220.

The compound of formula(III), a 3-N-substituted aminoalkylsulfonyl aminobenzene compound or a 3-N-substitutedamino-phenylsulfonylamino benzene compound, can be produced by reacting a compound represented by the following formula(IV):

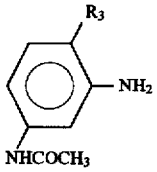

wherein $R_3$ is as defined above, a compound represented by the following formula(V):

wherein $R_4$ is as defined above and $X_1$ represents a leaving group which is substitutable by a nucleophile, such as a chlorine atom, a bromine atom, an iodine atom, a p-toluenesulfonyloxy group, a benzenesulfonyloxy group and the like, and a compound represented by the following formula(VI):

wherein $R_5$ is as defined above and $X_2$ represents a leaving group which is substitutable by a nucleophile, such as a chlorine atom, a bromine atom, a iodine atom, a p-toluenesulfonyloxy group, a benzenesulfonyloxy group and the like to obtain a compound represented by the following formula (VII):

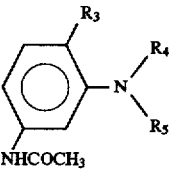

wherein $R_3$, $R_4$ and $R_5$ are as defined above; followed by hydrolyzing the resulting reaction compound of formula (VII) to obtain a compound represented by the following formula(VIII):

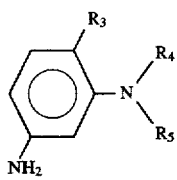

wherein $R_3$, $R_4$ and $R_5$ are as defined above; and, then, by reacting the resulting reaction compound of formula(VIII) with a compound represented by the following formula(IX):

wherein $R_2$ is as defined above.

There are various other known methods for producing a compound of the formula(VII) from a compound of the formula(IV). A method described in "Grundlagen der Synthese von Zwischen-produkten und Farbstoffen, Akademie-Verlag Berlin 1966, pp 577–631, N. N. Woroshzow can be mentioned as an example of them.

The monoazo compound of formula(I) is useful for dyeing and printing hydrophobic fiber materials, particularly for polyester fiber materials. A dye dispersion can be obtained by finely dispersing the monoazo compound according to a conventional method together with an appropriate dispersing agent such as naphthalenesulfonate-formalin condensate and ligninsulfonic acid in an aqueous medium. The dye dispersion thus obtained can be used as it is, i.e. in the form of liquid, or in the form of a powder obtained, for example, by spray drying. For dyeing, particularly for a high temperature dyeing method, a monoazo compound of the present invention is dispersed in an aqueous medium to obtain a dye dispersion, other components such as a pH adjusting agent or a dispersion level dyeing agent are added to the dye dispersion, if required, and, then, a hydrophobic fiber material is dipped into the dispersion to carry out dyeing. When polyester fiber material is used, dyeing is carried out under an elevated pressure usually at a temperature not lower than 105° C., preferably 110°–140° C. Alternatively, dyeing can be carried out in the presence of a carrier such as o-phenylphenol, trichlorobenzene and methylnaphthalene at a relatively high temperature, for example, in boiling water. Furthermore, such a dyeing process, so-called thermosol dyeing process, in which a dye dispersion is padded onto a cloth, followed by a steaming or a dry-heating at a temperature of 100° C. or higher may be carried out.

For printing, a dye dispersion may be kneaded with a suitable paste, and the resulting color paste may be padded on a cloth and then subjected to a steaming or thermosol treatment. Solvent dyeing in which an organic solvent such as trichloroethylene or perchloroethylene is used as dyeing medium can also be conducted.

For dyeing or printing hydrophobic fiber materials with the monoazo compound of formula(I), another dye may be blended with the monoazo compound and various kinds of additives may be added during preparation of the dye dispersion.

If necessary, dyed products obtained by dyeing or printing with the monoazo compound of formula(I) may be subjected to various kinds of after-finishing treatments such as softening, water repelling, feel-improving, antistatic and sanitary finishing.

Bright blue dyed products obtained by dyeing or printing hydrophobic fiber materials, such as polyester fiber materials, using monoazo compound of the formula(I) are excellent in various fastness such as light fastness, sublimation fastness and wet fastness. Particularly, they have a characteristic that the washing fastness does not deteriorate even after an after-finishing treatment or heat set treatment. For example, washing fastness of a polyester fiber material dyed in deep color(JIS 2/1 depth) with the monoazo compound of formula(I) and then subjected to a heat set treatment is much superior to that of a dyed product dyed with a conventional dye even when tested according to conditions corresponding to home washing(eg. AATCC IIA method). Using the monoazo compound of formula(I), very fine-denier fiber such as microfiber can be dyed in deep color relatively easily and a deep bright blue dyed product excellent in various fastness, particularly washing fastness, can be obtained.

The present invention will more concretely explained in reference to the following examples, which are never construed to limit the present invention. In the examples, "part" and "%" means "part by weight" and "% by weight", respectively.

EXAMPLE 1

A mixture of 1.69 parts of 2-amino-3-cyano-5-nitrothiophene, 2 parts of propionic acid and 8 parts of acetic acid was cooled down to 5° C. or below. To the mixture, 2.95 parts of 43% nitrosylsulfuric acid was dropwise added while keeping the temperature 10° C. or below, followed by stirring the mixture at 5° C. for a while to obtain a diazo solution.

The diazo solution thus obtained was added dropwise to a solution of 2.90 parts of 3-ethylsulfonylamino-N,N-diethylaniline and 70 parts of methanol. After completion of the dropwise addition, the reaction mixture was stirred for one hour while being cooled with ice to precipitate a crystalline product, followed by a filtration. The crystalline product obtained by the filtration was washed with methanol to obtain a monoazo compound represented by the following formula:

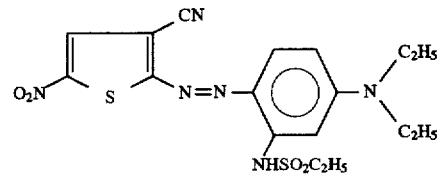

Solution of the monoazo compound in dimethyl formamide exhibits blue color and its λ max. was 634 nm.

EXAMPLE 2

1.0 part of monoazo compound obtained in Example 1 together with 3.0 parts of a condensation product of naphthalene sulfonic acid and formaldehyde was finely pulverized in aqueous medium, followed by drying the dye dispersion to obtain dye powder. To a dye bath containing 0.6 part of the dye powder thus obtained, 10 parts of Tetron jersey (a polyester fiber textile manufactured by Toray Co., Ltd.) was dipped and dyeing was carried out for 60 minutes under an elevated pressure at a temperature of 130°–135° C. Thereafter, the dyed product was subjected to a reduction-rinsing treatment for 10 minutes at a temperature of 85° C. with a solution consisting of 3 parts of sodium hydroxide, 3 parts of hydrosulfite, 3 parts of betaine type amphoteric surfactant and 3000 parts of water, washed with water and dried to obtain a deep bright blue-colored dyed product. The dyed product thus obtained was excellent in light fastness, sublimation fastness and wet fastness.

The dyed product was, then, subjected to softening antistatic finishing according the following manner.

A padding liquor containing Sumitex softener LK-1, a softener manufactured by Sumitomo Chemical Co., Ltd. in a concentration of 10 g/L and Sumistat F-1, an antistatic agent manufactured by Sumitomo Chemical Co., Ltd. in a concentration of 5 g/L was prepared. In the padding liquor, the dyed product obtained above was dipped and squeezed uniformly so that the weight-increasing ratio became 80%. Thereafter, the dye product was dipped again, squeezed again similarly, then, subjected to an intermediate drying for 2 minutes at a temperature of 80° C., followed by a heat set treatment for a minute at a temperature of 170° C. Then, washing fastness of the dyed product was measured according to AATCC IIA method. The washing fastness thus measured was grade 5.

Comparative Example 1

Example 2 was repeated except that the monoazo compound obtained in Example 1 was replaced by a compound represented by the following formula

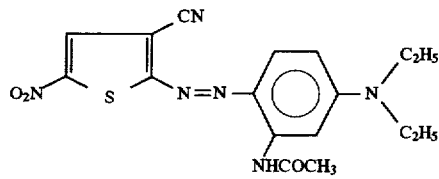

which is described in JP-A-48-84120. The dyed product thus obtained exhibits dull blue color. After softening antistatic finishing, the washing fastness of the dyed product was measured according to AATCC IIA method. The washing fastness thus measured was grade 3.

Comparative Example 2

Example 2 was repeated except that the monoazo compound obtained in Example 1 was replaced by a compound represented by the following formula

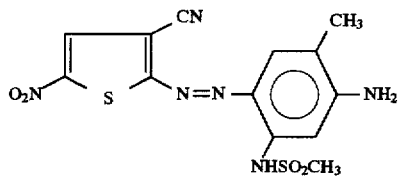

which is described in JP-A-48-84120. The dyed product thus obtained exhibits dull reddish blue color.

EXAMPLE 3

1.3 parts of monoazo compound obtained in Example 1 was finely pulverized together with 3.7 parts of lignin sulfonic acid, and to the resulting dye dispersion, 35 parts of warm water and 60 parts of half-emulsion paste of the following formulation were added and mixed to prepare a printing paste.

| o/w emulsion | 300 parts |
| Mayprogum NP12% paste | 694 parts |
| sodium chlorate | 4 parts |

-continued

| tartaric acid | 2 parts |
| Total | 1000 parts |

Using the printing paste, Tetron tropical (a polyester fiber textile manufactured by Toray Co., Ltd.) was printed, dried and, then, subjected to steaming for 7 minutes under atmospheric pressure at a temperature of 170° C. with a high-temperature steamer for fixing the dye. Thereafter, according to the same method as that in Example 2, reduction-rinsing treatment, washing with water, softening and antistatic finishing were carried out in the mentioned order to obtain a deep bright blue dyed product. The dyed product was excellent in wet fastness, light fastness and sublimation fastness.

EXAMPLE 4

Example 1 was repeated except that 2.90 parts of 3-ethylsulfonylamino-N,N-diethylaniline was replaced by 4.7 parts of 3-methylsulfonylamino-N,N-[2-(2-ethoxyethoxy)ethyl] aniline to obtain a monoazo compound represented by the following formula:

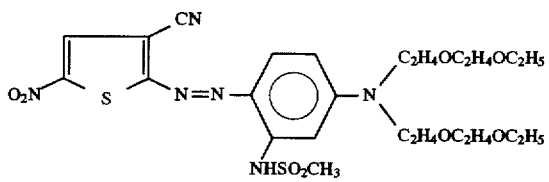

Solution of the monoazo compound in dimethylformamide exhibits blue color, and its λ max. was 630 nm. Then, Example 2 was repeated except that the monoazo compound obtained in Example 1 was replaced by the monoazo compound obtained in this Example. The dyed product thus obtained was excellent in wet fastness, light fastness and sublimation fastness.

EXAMPLE 5

Example 1 was repeated except that 2.90 parts of 3-ethylsulfonylamino-N,N-diethylaniline was replaced by 3.5 parts of 3-methylsulfonylamino-N-(2-phenoxyethyl) aniline to obtain a monoazo compound represented by the following formula:

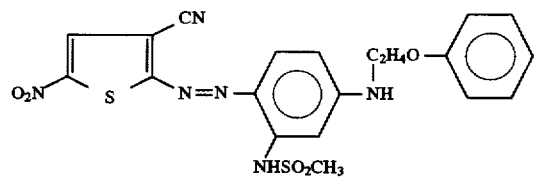

Solution of the monoazo compound in dimethylformamide exhibits blue color, and its λ max. was 640 nm. Then, Example 2 was repeated except that the monoazo compound obtained in Example 1 was replaced by the monoazo compound obtained in this Example. The dyed product thus obtained was excellent in wet fastness, light fastness and sublimation fastness.

The light fastness was grade 5 which was evaluated according to JIS L0842 by using a carbon arc as the light source. In order to evaluate color depth of the dyed product, a measurement of SQ value was conducted. SQ value is obtained by measuring optical density at each wave length which was obtained from reflection ratio of natural light (light source : day-light D65) on dyed product with SICOMAC-20 (a color measuring apparatus manufactured by Sumika Chemical Analysis Co., Ltd.). SICOMAC-20 is an measuring apparatus equipped with a light source, a spectrometer, a computer for data calculation. SQ value indicates relative color densities on the surface of dyed product. The higher the SQ value, the higher the dyeing ability. SQ value of the dyed product in this Example thus measured was 31.

Comparative Example 3

Example 1 was repeated except that 2.90 parts of 3-ethylsulfonylamino-N,N-diethylaniline was replaced by 4.8 parts of 3-methylsulfonylamino-N,N-di(2-phenoxyethyl) aniline to obtain a monoazo compound represented by the following formula:

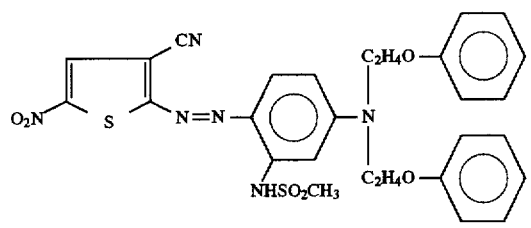

Then, Example 2 was repeated except that the monoazo compound obtained in Example 1 was replaced by the monoazo compound obtained in this Example. Dyeablity of the compound and fastness such as light fastness of the dyed product are insufficient.

The light fastness was grade 3 which was evaluated according to JIS L0842by using a carbon arc as the light source. SQ value of the dyed product in this Example was 10.

Examples 6–184

Example 1 was repeated except that 3-ethylsulfonylamino-N,N-diethylaniline was replaced by 3-N-substituted amino-alkylsulfonylamino benzene or 3-N-substituted amino-phenylsulfonylamino benzene represented by the formula(III) in which $R_2$, $R_3$, $R_4$ and $R_5$ are those described in the following Tables 1–14 to obtain a monoazo compound having blue color. In the Tables, Ph and THF mean a phenyl group and a tetrahydrofurfuryl group, respectively.

$\lambda$ max., light fastness and washing fastness of the monoazo compounds obtained in Example 11, 16–19, 65 and 181–184 were measured and the results are shown in Table 15. The washing fastness was measured according to the same manner as in Example 2, i.e. according to AATCC IIA method. The light fastness was measured according to JIS L0842 using a carbon arc as the light source.

TABLE 1

| Exp. No. | $R_2$ | $R_3$ | $R_4$ | $R_5$ |
|---|---|---|---|---|
| 6 | $CH_3$ | H | $C_2H_5$ | $C_2H_5$ |
| 7 | $CH_3$ | H | $C_2H_4OC_3H_7$ (n) | $C_2H_4OC_3H_7$ (n) |
| 8 | $CH_3$ | H | $C_2H_4OC_3H_7$ (i) | $C_2H_4OC_3H_7$ (i) |
| 9 | $CH_3$ | H | n-$C_5H_{11}$ | n-$C_5H_{11}$ |
| 10 | $CH_3$ | H | n-$C_3H_7$ | n-$C_3H_7$ |
| 11 | $CH_3$ | H | $C_2H_4OCO_2C_2H_5$ | $C_2H_4OCO_2C_2H_5$ |

TABLE 1-continued

| Exp. No. | $R_2$ | $R_3$ | $R_4$ | $R_5$ |
|---|---|---|---|---|
| 12 | $CH_3$ | H | $CH_3$ | $CH_3$ |
| 13 | $CH_3$ | H | $C_3H_6OCO_2C_2H_5$ | $C_3H_6OCO_2C_2H_5$ |
| 14 | $CH_3$ | H | $C_3H_6OC_2H_5$ | $C_3H_6OC_2H_5$ |
| 15 | $CH_3$ | H | $C_2H_4OC_2H_4OCH_3$ | $C_2H_4OC_2H_4OCH_3$ |
| 16 | $CH_3$ | H | $C_2H_4OCO_2CH_3$ | $C_2H_4OCO_2CH_3$ |
| 17 | $CH_3$ | H | $C_2H_4OCOC_2H_5$ | $C_2H_4OCOC_2H_5$ |
| 18 | $CH_3$ | H | $C_2H_4OCO_2C_3H_7$-n | $C_2H_4OCO_2C_3H_7$-n |
| 19 | $CH_3$ | H | $C_2H_4OCOC_3H_7$-n | $C_2H_4OCOC_3H_7$-n |
| 20 | $CH_3$ | H | $C_2H_4CO_2CH_3$ | $C_2H_4CO_2CH_3$ |

TABLE 2

| Exp. No. | $R_2$ | $R_3$ | $R_4$ | $R_5$ |
|---|---|---|---|---|
| 21 | $CH_3$ | H | $C_2H_4CO_2C_3H_7$-n | $C_2H_4CO_2C_3H_7$-n |
| 22 | $CH_3$ | H | $C_2H_4CN$ | $C_2H_5$ |
| 23 | $CH_3$ | H | $C_2H_4CN$ | $C_2H_4OPh$ |
| 24 | $C_2H_5$ | H | $CH_3$ | $CH_3$ |
| 25 | $C_2H_5$ | H | $C_3H_6OCO_2C_2H_5$ | $C_3H_6OCO_2C_2H_5$ |
| 26 | $C_2H_5$ | H | $C_3H_6OC_2H_5$ | $C_3H_6OC_2H_5$ |
| 27 | $C_2H_5$ | H | $C_2H_4OC_2H_4OCH_3$ | $C_2H_4OC_2H_4OCH_3$ |
| 28 | $C_2H_5$ | H | $C_2H_4OCO_2CH_3$ | $C_2H_4OCO_2CH_3$ |
| 29 | $C_2H_5$ | H | $C_2H_4OCOC_2H_5$ | $C_2H_4OCOC_2H_5$ |
| 30 | $C_2H_5$ | H | $C_2H_4OCO_2C_3H_7$-n | $C_2H_4OCO_2C_3H_7$-n |
| 31 | $C_2H_5$ | H | $C_2H_4OCOC_3H_7$-n | $C_2H_4OCOC_3H_7$-n |
| 32 | $C_2H_5$ | H | $C_2H_4CO_2C_3H_7$-n | $C_2H_4CO_2C_3H_7$-n |
| 33 | $C_2H_5$ | H | $C_2H_4CO_2CH_3$ | $C_2H_4CO_2CH_3$ |
| 34 | $C_2H_5$ | H | $C_2H_4CN$ | $C_2H_5$ |
| 35 | $C_2H_5$ | H | $C_2H_4CN$ | $C_2H_4OPh$ |
| 36 | $C_2H_5$ | H | $C_2H_4OC_2H_5$ | $C_2H_4OC_2H_5$ |

TABLE 3

| Exp. No. | $R_2$ | $R_3$ | $R_4$ | $R_5$ |
|---|---|---|---|---|
| 37 | $C_2H_5$ | H | $C_2H_4OC_3H_7$ | $C_2H_4OC_3H_7$ |
| 38 | $C_2H_5$ | H | $C_2H_4OC_2H_4OC_2H_5$ | $C_2H_4OC_2H_4OC_2H_5$ |
| 39 | $C_2H_5$ | H | $C_2H_4OPh$ | H |
| 40 | $CH_3$ | H | $C_2H_5$ | $C_2H_4OPh$ |
| 41 | $CH_3$ | H | $C_2H_4CN$ | $C_2H_4CN$ |
| 42 | $CH_3$ | H | $C_2H_4OH$ | $C_2H_4OPh$ |
| 43 | $CH_3$ | H | $C_2H_4CN$ | $C_2H_4Ph$ |
| 44 | $CH_3$ | H | $C_2H_5$ | $C_2H_4Ph$ |
| 45 | $CH_3$ | H | $C_2H_4Ph$ | H |
| 46 | $CH_3$ | H | $CH_2Ph$ | $C_2H_5$ |
| 47 | $CH_3$ | H | $CH_2CH(OH)CH_2OPh$ | H |
| 48 | $CH_3$ | H | $C_2H_4OC_4H_9$-n | $C_2H_4OC_4H_9$-n |
| 49 | $CH_3$ | H | $CH_2CH=CH_2$ | $CH_2CH=CH_2$ |
| 50 | $CH_3$ | H | $C_2H_5$ | $C_2H_4OCOPh$ |
| 51 | $CH_3$ | H | n-$C_6H_{13}$ | n-$C_6H_{13}$ |
| 52 | $CH_3$ | H | $C_2H_5$ | $C_4H_8OCOCH_3$ |

TABLE 4

| Exp. No. | $R_2$ | $R_3$ | $R_4$ | $R_5$ |
|---|---|---|---|---|
| 53 | $CH_3$ | H | n-$C_4H_9$ | $CH_2CH_2CH_2Ph$ |
| 54 | $CH_3$ | $OCH_3$ | $C_2H_5$ | $C_2H_5$ |
| 55 | $CH_3$ | $OC_2H_5$ | $C_2H_5$ | $C_2H_5$ |
| 56 | Ph | H | $C_2H_5$ | $C_2H_5$ |
| 57 | Ph | H | $C_2H_4OC_2H_4OC_2H_5$ | $C_2H_4OC_2H_4OC_2H_5$ |
| 58 | Ph | H | $C_2H_4OC_2H_5$ | $C_2H_4OC_2H_5$ |
| 59 | Ph | H | $C_2H_4OCO_2CH_3$ | $C_2H_4OCO_2CH_3$ |
| 60 | Ph | H | $C_2H_4OCOC_2H_5$ | $C_2H_4OCOC_2H_5$ |
| 61 | Ph | H | $C_2H_4OCO_2C_3H_7$-n | $C_2H_4OCO_2C_3H_7$-n |
| 62 | Ph | H | $C_2H_4OCOC_3H_7$-n | $C_2H_4OCOC_3H_7$-n |
| 63 | $CH_3$ | $OCH_3$ | $C_2H_4CN$ | $C_2H_4CN$ |
| 64 | $CH_3$ | $OCH_3$ | $C_2H_4OCH_3$ | $C_2H_4OCH_3$ |
| 65 | $CH_3$ | H | $C_2H_4OCOCH_3$ | $C_2H_4OCOCH_3$ |

TABLE 4-continued

| Exp. No. | $R_2$ | $R_3$ | $R_4$ | $R_5$ |
|---|---|---|---|---|
| 66 | Ph | H | $C_2H_4OH$ | $C_2H_4CN$ |
| 67 | $CH_3$ | H | 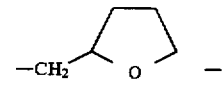 | 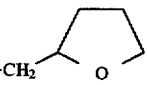 |
| 68 | $CH_3$ | H | H | 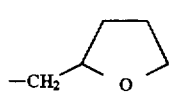 |

TABLE 5

| Exp. No. | $R_2$ | $R_3$ | $R_4$ | $R_5$ |
|---|---|---|---|---|
| 69 | $CH_3$ | H | $CH_2CO_2CH_3$ | $CH_2CO_2CH_3$ |
| 70 | $CH_3$ | H | $C_2H_4CO_2C_2H_4OC_2H_5$ | H |
| 71 | $CH_3$ | H | $C_3H_6CO_2C_2H_5$ | $C_3H_6CO_2C_2H_5$ |
| 72 | $CH_3$ | H | $CH_2CO_2C_2H_5$ | $CH_2CO_2C_2H_5$ |
| 73 | $CH_3$ | H | $C_2H_4CO_2C_2H_4OCH_3$ | $C_2H_5$ |
| 74 | $CH_3$ | H | $CH_2CO_2C_3H_7$-n | $CH_2CO_2C_3H_7$-n |
| 75 | $CH_3$ | H | $C_3H_6CO_2CH_3$ | $C_3H_6CO_2CH_3$ |
| 76 | $CH_3$ | H | $C_2H_4CO_2$-THF | $CH_3$ |
| 77 | $CH_3$ | H | $C_2H_4CO_2C_2H_4OC_2H_4$ | $C_2H_4CO_2C_2H_4OC_2H_4$ |
| 78 | $CH_3$ | H | $C_2H_4CO_2CH_3$ | $C_2H_5$ |
| 79 | $CH_3$ | H | $C_2H_4CO_2C_2H_4OC_2H_5$ | $C_2H_5$ |
| 80 | $CH_3$ | H | $C_2H_4CO_2C_2H_4OCH_3$ | H |

TABLE 6

| Exp. No. | $R_2$ | $R_3$ | $R_4$ | $R_5$ |
|---|---|---|---|---|
| 81 | $CH_3$ | H | $C_2H_4CO_2$-THF | H |
| 82 | $CH_3$ | H | $C_2H_4CO_2C_2H_5$ | $C_2H_4CO_2C_2H_5$ |
| 83 | $CH_3$ | H | $C_2H_4CO_2C_3H_7$-n | $CH_3$ |
| 84 | $CH_3$ | H | $C_2H_4CO_2C_2H_5$ | $C_2H_5$ |
| 85 | $CH_3$ | H | $C_2H_4CO_2CH_3$ | $C_3H_7$-n |
| 86 | $CH_3$ | H | $C_2H_4CO_2C_2H_5$ | $C_4H_9$-n |
| 87 | $CH_3$ | H | $C_2H_4CO_2C_2H_5$ | $CH_3$ |
| 88 | $CH_3$ | H | $C_2H_4CO_2CH_3$ | H |
| 89 | $CH_3$ | H | $C_2H_4CO_2C_3H_7$-n | $C_3H_7$-n |
| 90 | $CH_3$ | H | $C_2H_4CO_2C_4H_9$-n | $C_2H_5$ |
| 91 | $CH_3$ | H | $C_2H_4CO_2C_2H_5$ | H |

TABLE 7

| Exp. No. | $R_2$ | $R_3$ | $R_4$ | $R_5$ |
|---|---|---|---|---|
| 92 | $CH_3$ | H | $C_2H_4CO_2C_2H_5$ | $C_2H_4OC_2H_5$ |
| 93 | $CH_3$ | H | $C_2H_4CO_2C_2H_5$ | $C_3H_7$-n |
| 94 | $CH_3$ | H | $C_2H_4CO_2C_2H_4OCH_3$ | $C_2H_4CO_2C_2H_4OCH_3$ |
| 95 | $CH_3$ | H | $C_2H_4CO_2C_3H_7$-n | H |
| 96 | $CH_3$ | H | $C_2H_4CO_2$-THF | $C_2H_5$ |
| 97 | $CH_3$ | H | $C_2H_4CO_2C_3H_7$-n | $C_2H_5$ |
| 98 | $CH_3$ | H | $C_2H_4CO_2C_2H_5$ | $C_2H_4OCH_3$ |
| 99 | $CH_3$ | H | $C_2H_4CO_2C_4H_9$-n | H |
| 100 | $CH_3$ | H | $C_2H_4CO_2$-THF | $C_2H_4CO_2$-THF |
| 101 | $CH_3$ | H | $C_2H_4CO_2CH_3$ | $C_2H_4OC_2H_4OC_2H_5$ |
| 102 | $CH_3$ | H | $C_2H_4OPh$ | $C_4H_9$-n |

TABLE 8

| Exp. No. | $R_2$ | $R_3$ | $R_4$ | $R_5$ |
|---|---|---|---|---|
| 103 | $CH_3$ | H | $C_2H_4OPh$ | $C_2H_4CO_2C_2H_5$ |
| 104 | $CH_3$ | H | $C_2H_4OPh$ | $CH_3$ |
| 105 | $CH_3$ | H | $CH_2CO_2C_2H_5$ | $C_2H_4OPh$ |

TABLE 8-continued

| Exp. No. | $R_2$ | $R_3$ | $R_4$ | $R_5$ |
|---|---|---|---|---|
| 106 | $CH_3$ | H | $C_2H_4CO_2C_2H_4OCH_3$ | $C_2H_4OPh$ |
| 107 | $CH_3$ | H | $C_3H_7$-n | $C_2H_4OPh$ |
| 108 | $CH_3$ | H | $C_2H_4OC_2H_5$ | $C_2H_4OPh$ |
| 109 | $CH_3$ | H | $C_2H_4CO_2CH_3$ | $C_2H_4OPh$ |
| 110 | $CH_3$ | H | $C_2H_4OC_2H_4OC_2H_5$ | H |
| 111 | $CH_3$ | H | $C_2H_4OC_2H_5$ | H |
| 112 | $CH_3$ | H | $C_2H_4OPh$ | $CH_2OC_3H_7$-n |
| 113 | $CH_3$ | H | $C_2H_4OPh$ | $C_2H_4CO_2C_3H_7$-n |
| 114 | $CH_3$ | H | $C_2H_4OCOC_2H_5$ | $C_2H_4OPh$ |

TABLE 9

| Exp. No. | $R_2$ | $R_3$ | $R_4$ | $R_5$ |
|---|---|---|---|---|
| 115 | $CH_3$ | H | $C_2H_4OC_4H_9$-n | $C_2H_4OPh$ |
| 116 | $CH_3$ | H | $C_2H_4OPh$ | $C_2H_4CO_2$-THF |
| 117 | $CH_3$ | H | $C_2H_4OPh$ | $C_2H_4OCOC_3H_7$-n |
| 118 | $CH_3$ | H | $C_2H_4OPh$ | $C_2H_4OCH_3$ |
| 119 | $CH_3$ | H | $C_4H_8(n)$-$OC_2H_5$ | $C_2H_4OPh$ |
| 120 | $CH_3$ | H | $C_2H_4OCOOC_2H_5$ | $C_2H_4OPh$ |
| 121 | $CH_3$ | H | $C_2H_4OC_3H_7$-n | $C_2H_4OPh$ |
| 122 | $CH_3$ | H | $C_2H_4OPh$ | $C_2H_4OCOOCH_3$ |
| 123 | $CH_3$ | H | $C_2H_4OPh$ | $C_3H_6OCH_3$ |
| 124 | $CH_3$ | H | $C_2H_4OCOOC_3H_7$-n | $C_2H_4OPh$ |
| 125 | $CH_3$ | H | $C_2H_4OPh$ | $C_2H_4OCOCH_3$ |

TABLE 10

| Exp. No. | $R_2$ | $R_3$ | $R_4$ | $R_5$ |
|---|---|---|---|---|
| 126 | $CH_3$ | H | $C_3H_7$-i | $C_3H_7$-i |
| 127 | $CH_3$ | H | $C_2H_5$ | H |
| 128 | $CH_3$ | H | H | $C_5H_{11}$-n |
| 129 | $CH_3$ | H | $C_2H_4OH$ | $C_2H_4OH$ |
| 130 | $CH_3$ | H | $C_2H_4OCH_3$ | $C_2H_4OCH_3$ |
| 131 | $CH_3$ | H | $C_3H_6OCH_3$ | $C_3H_6OCH_3$ |
| 132 | $CH_3$ | H | $C_4H_8(n)$-$OCH_3$ | $C_4H_8(n)$-$OCH_3$ |
| 133 | $CH_3$ | H | $C_6H_{12}(n)$-$OCH_3$ | $C_6H_{12}(n)$-$OCH_3$ |
| 134 | $CH_3$ | H | $C_2H_4OC_2H_5$ | $C_2H_5$ |
| 135 | $CH_3$ | H | $C_2H_5$ | $C_2H_4OC_2H_4OC_2H_5$ |
| 136 | $CH_3$ | H | $C_5H_{11}$-n | $C_2H_4OCH_3$ |
| 137 | $CH_3$ | H | $C_2H_4OC_4H_9$-n | $C_2H_5$ |

TABLE 11

| Exp. No. | $R_2$ | $R_3$ | $R_4$ | $R_5$ |
|---|---|---|---|---|
| 138 | $CH_3$ | H | $C_2H_4OC_2H_5$ | $CH_3$ |
| 139 | $CH_3$ | H | $C_3H_7$-n | $C_2H_4OCH_3$ |
| 140 | $CH_3$ | H | $CH_3$ | $C_2H_4OC_2H_4OC_2H_5$ |
| 141 | $CH_3$ | H | $C_2H_4CN$ | $C_2H_4OCOPh$ |
| 142 | $CH_3$ | H | $C_4H_8(n)$-$OCOOCH_3$ | $C_4H_8(n)$-$OCOOCH_3$ |
| 143 | $CH_3$ | H | $C_2H_4OCOOC_2H_5$ | $C_2H_4OH$ |
| 144 | $CH_3$ | H | $C_2H_4CN$ | $C_2H_4OCOOPh$ |
| 145 | $CH_3$ | H | $C_2H_4OH$ | $C_2H_4OCOC_2H_5$ |
| 146 | Ph | H | $CH_3$ | $CH_3$ |
| 147 | Ph | H | $C_2H_4OCOOC_2H_5$ | H |
| 148 | Ph | H | $C_6H_{13}$-n | $C_6H_{13}$-n |
| 149 | Ph | H | $C_2H_4COCH_3$ | $C_2H_4COCH_3$ |

TABLE 12

| Exp. No. | $R_2$ | $R_3$ | $R_4$ | $R_5$ |
|---|---|---|---|---|
| 150 | Ph | H | $C_2H_4COC_2H_5$ | H |
| 151 | Ph | H | $C_4H_9$-n | $C_4H_9$-n |
| 152 | Ph | H | $CH_3$ | $C_2H_4OPh$ |
| 153 | Ph | H | $C_2H_4COC_2H_5$ | $C_2H_4COC_2H_5$ |

TABLE 12-continued

| Exp. No. | R₂ | R₃ | R₄ | R₅ |
|---|---|---|---|---|
| 154 | Ph | H | H | $C_2H_4OCOCH_3$ |
| 155 | Ph | H | $C_2H_5$ | $C_2H_4OPh$ |
| 156 | Ph | H | $C_2H_4COCH_3$ | $C_2H_5$ |
| 157 | Ph | H | $C_2H_4OPh$ | H |
| 158 | Ph | H | $C_2H_4COOC_2H_4OCH_3$ | $CH_3$ |
| 159 | Ph | H | H | $C_2H_4COCH_3$ |
| 160 | Ph | H | H | $C_2H_4COOC_2H_4OCH_3$ |

TABLE 13

| Exp. No. | R₂ | R₃ | R₄ | R₅ |
|---|---|---|---|---|
| 161 | $CH_3$ | H | $C_2H_4OC_2H_5$ | $C_2H_4OC_2H_5$ |
| 162 | $CH_3$ | H | $C_2H_4CN$ | $C_2H_4OC_2H_4OC_2H_5$ |
| 163 | $CH_3$ | H | $C_2H_4OC_2H_4OPh$ | $C_2H_4CN$ |
| 164 | $C_2H_5$ | H | $C_2H_4OCOCH_3$ | $C_2H_4OPh$ |
| 165 | $C_2H_5$ | H | $C_2H_4OCOOC_2H_5$ | $C_2H_4OCOOC_2H_5$ |
| 166 | $C_2H_5$ | H | $C_2H_4COOC_2H_5$ | $C_2H_4COOC_2H_5$ |
| 167 | $C_2H_5$ | H | $C_3H_7$-n | $C_2H_4COOCH_3$ |
| 168 | $C_2H_5$ | H | $C_2H_4CN$ | $C_2H_4OCOOC_2H_5$ |
| 169 | $C_2H_5$ | H | H | $C_2H_4COOC_2H_5$ |
| 170 | $C_2H_5$ | H | $C_2H_4OCOOC_2H_5$ | $C_2H_4OPh$ |
| 171 | $C_2H_5$ | H | H | $CH_2COOC_2H_5$ |
| 172 | $C_2H_5$ | H | $C_2H_4COOC_2H_5$ | $C_2H_5$ |

TABLE 14

| Exp. No. | R₂ | R₃ | R₄ | R₅ |
|---|---|---|---|---|
| 173 | $C_2H_5$ | H | $CH_2COOC_2H_5$ | $CH_2COOC_2H_5$ |
| 174 | $C_2H_5$ | H | $C_2H_4COOC_2H_4OCH_3$ | $C_2H_5$ |
| 175 | $C_2H_5$ | H | $C_2H_4OC_2H_4OC_2H_5$ | $C_2H_4OPh$ |
| 176 | $C_2H_5$ | H | H | $C_2H_4COOC_2H_4OCH_3$ |
| 177 | $C_2H_5$ | H | $C_2H_4COO$—THF | H |
| 178 | $C_2H_5$ | H | $C_2H_4COOC_2H_4OCH_3$ | $C_2H_4COOC_2H_4OCH_3$ |
| 179 | $C_2H_5$ | H | $C_2H_4OPh$ | $C_2H_4OC_2H_5$ |
| 180 | $C_2H_5$ | H | $CH_2COOCH_3$ | $C_2H_5$ |
| 181 | $CH_3$ | H | $C_2H_4OCO_2C_4H_9$-n | $C_2H_4OCO_2C_4H_9$-n |
| 182 | $CH_3$ | H | $C_2H_4OCO_2C_5H_{11}$-n | $C_2H_4OCO_2C_5H_{11}$-n |
| 183 | $CH_3$ | H | $C_2H_4OCOC_4H_9$-n | $C_2H_4OCOC_4H_9$-n |
| 184 | $CH_3$ | H | $C_2H_4OCOC_5H_{11}$-n | $C_2H_4OCOC_5H_{11}$-n |

TABLE 15

| Exp. No. | λmax | Light Fastness (grade) | Washing Fastness (grade) |
|---|---|---|---|
| 11 | 623 nm | 4–5 | 4–5 |
| 16 | 623 nm | 4–5 | 5 |
| 17 | 623 nm | 4–5 | 5 |
| 18 | 623 nm | 4–5 | 5 |
| 19 | 623 nm | 4–5 | 4–5 |
| 65 | 623 nm | 4–5 | 5 |
| 181 | 623 nm | 4–5 | 5 |
| 182 | 623 nm | 4–5 | 5 |
| 183 | 623 nm | 4–5 | 5 |
| 184 | 623 nm | 4–5 | 5 |

According to same procedures as in Example 1 except that 3-ethylsulfonylamino-N,N-diethylaniline was replaced by 3-N-substituted amino-alkylsulfonylamino benzene represented by the formula(III) in which $R_2$, $R_3$, $R_4$ and $R_5$ are those described in the following Table 16, a monoazo compound having blue color can be obtained.

TABLE 16

| Exp. No. | R₂ | R₃ | R₄ | R₅ |
|---|---|---|---|---|
| 185 | $CH_3$ | H | $C_2H_4CO_2CH_3$ | $C_4H_9$-n |
| 186 | $CH_3$ | H | $C_2H_4CO_2$—$C_3H_7$-n | $C_4H_9$-n |
| 187 | $CH_3$ | H | $C_2H_4CO_2C_4H_9$-n | $C_4H_9$-n |
| 188 | $CH_3$ | H | $C_2H_4CO_2C_4H_9$-n | $C_3H_7$-n |
| 189 | $CH_3$ | H | $C_2H_4CO_2C_4H_9$-n | $CH_3$ |
| 190 | $CH_3$ | H | $C_2H_4CO_2C_4H_9$-n | $C_2H_4CO_2C_4H_9$-n |
| 191 | $CH_3$ | H | $C_2H_4CO_2CH_3$ | $C_6H_{13}$-n |
| 192 | $CH_3$ | H | $C_2H_4CO_2CH_3$ | $C_5H_{11}$-n |

What we claim is:

1. A monoazo compound represented by the following formula (I):

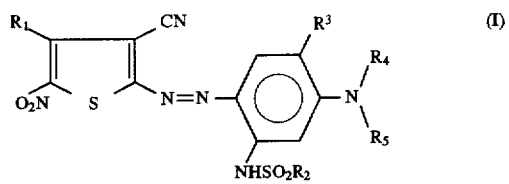

wherein $R_1$ represents a hydrogen atom or a chlorine atom; $R_2$ represents a phenyl group or a straight chain or branched chain alkyl group which is unsubstituted or substituted; $R_3$ is a hydrogen atom or $C_1$–$C_4$ alkoxy; and $R_4$ and $R_5$, which are same or different, represent a hydrogen atom, an allyl group, a tetrahydrofurfuryl group, or a straight chain or branched chain $C_1$–$C_6$ alkyl group which is unsubstituted or substituted by one or two substituents selected from a chlorine atom, a bromine atom, a cyano group, an alkoxy group, a phenoxyalkoxy group, a phenoxy group, a phenyl group, a benzyloxy group, an alkoxycarbonyl group, an alkoxycarbonyloxy group, an alkanoyloxy group, a benzoyloxy group, a phenoxycarbonyloxy group, an alkanoyl group, an alkoxyalkoxycarbonyl group, a tetrahydrofurfuryloxy carbonyl group and an alkoxyalkoxy group; provided that $R_4$ and $R_5$ are not simultaneously hydrogen atoms, and that $R_4$ and $R_5$ are not simultaneously straight chain or branched chain $C_1$–$C_6$ alkyl groups which are substituted by one or two substituents selected from a phenoxyalkoxy group, a phenoxy group, a phenyl group, a benzyloxy group, a benzoyloxy group, a phenoxycarbonyloxy group, an alkoxycarbonyl group, an alkoxycarbonyloxy group, and alkanoyloxy group, an alkoxyalkoxycarbonyl group, a tetrahydrofurfuryloxycarbonyl group and a cyano group.

2. A monoazo compound according to claim 1 wherein $R_1$ is a hydrogen atom.

3. A monoazo compound according to claim 1 wherein $R_4$ and $R_5$, which are same or different, are a hydrogen atom; an allyl group; a tetrahydrofurfuryl group; or a straight chain or branched chain $C_1$–$C_6$ alkyl group which is unsubstituted or substituted by one or two substituents selected from a cyano group, a $C_1$–$C_4$ alkoxy group, a hydroxy group, a phenoxyalkoxy group, a phenoxy group, a phenyl group, a $C_2$–$C_5$ alkanoyloxy group, a benzoyloxy group, a $C_2$–$C_5$ alkoxycarbonyl group, a $C_2$–$C_5$ alkoxycarbonyloxy group, a phenoxycarbonyloxy group, an alkoxyalkoxycarbonyl group in which each of the alkoxy groups has one to four carbon atoms, an alkoxyalkoxy group in which each of the alkoxy groups has one to four carbon atoms and a tetrahydrofurfuryloxy carbonyl group.

4. A monoazo compound according to claim 3 wherein $R_4$ and $R_5$, which are same or different, are a hydrogen atom; an allyl group; a tetrahydrofurfuryl group; or a straight chain or branched chain $C_1$–$C_6$ alkyl group which is unsubstituted or substituted by one or two substituents selected from a cyano group, a $C_1$–$C_4$ alkoxy group, a hydroxy group, a $C_2$–$C_5$ alkoxycarbonyl group, a $C_2$–$C_5$ alkoxycarbonyloxy group, a $C_2$–$C_5$ alkanoyloxy group, a phenoxy group, an alkoxyalkoxycarbonyl group in which each of the alkoxy groups has one to four carbon atoms, an alkoxyalkoxy group in which each of the alkoxy groups has one to four carbon atoms, and a tetrahydrofurfuryloxy carbonyl group.

5. A monoazo compound according to claim 1 wherein $R_2$ is a phenyl group or a straight chain or branched chain $C_1$–$C_4$ alkyl group.

6. A monoazo compound according to claim 1 wherein $R_2$ is a phenyl group, a methyl group or an ethyl group.

7. A monoazo compound according to claim 1 wherein $R_3$ is a hydrogen atom.

8. A method for dyeing or printing hydrophobic fiber materials which comprises a step applying a monoazo compound according to claim 1 to the hydrophobic fiber materials.

* * * * *